June 28, 1966   T. MARGITTAI   3,257,738
PROCESS AND APPARATUS FOR DEHYDRATING MOISTURE
CONTAINING MATERIALS
Filed Sept. 24, 1962
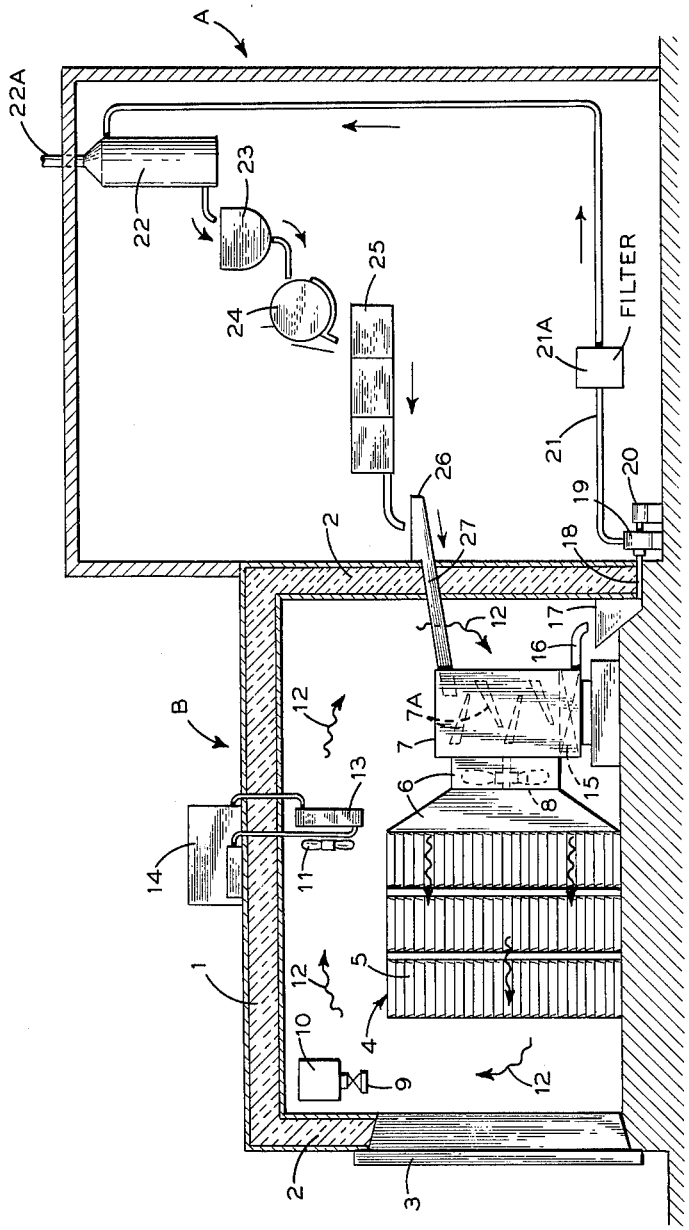
INVENTOR.
Thomas Margittai
BY
S.C. Yuter
ATTORNEY 3,257,738
PROCESS AND APPARATUS FOR DEHYDRATING MOISTURE CONTAINING MATERIALS
Thomas Margittai, Sao Paulo, Brazil, assignor of one-third to Franklin Chao, one-third to Seymour C. Yuter, and one-third to Andrew Gabriel Margittai
Filed Sept. 24, 1962, Ser. No. 225,655
Claims priority, application Great Britain, Oct. 11, 1961, 36,466/61
17 Claims. (Cl. 34—27)

The application is a continuation-in-part of application Serial No. 202,344, filed May 21, 1962.

This invention relates to a process and apparatus for dehydrating materials containing moisture, such as food products, chemicals and pharmaceuticals.

Conventional dehydrating procedures are essentially based on (1) the freeze drying process under vacuum; and (2) gaseous drying media at elevated temperatures. Both procedures entail the use of extensive mechanical equipment representing substantial capital investment, and further require large energy inputs which produce relatively high operating costs.

An object of this invention is to provide an improved process for dehydrating food products and the like at substantially atmospheric pressure and under other conditions which substantially minimize the energy input thereof, thereby materially reducing capital and operating costs, yet producing dehydrated products of excellent quality.

A feature of this invention is an improved dehydration procedure which includes a main closed dehydration circuit and an auxiliary closed circuit for continuously regenerating a hygroscopic agent used in the main circuit, said main and auxiliary circuits being interrelated to insure maximum efficiency of operation and dehydrated product of excellent quality.

In accordance with a preferred embodiment of this invention, an improved dehydrating procedure is provided comprising the constant recirculation of a gaseous drying medium within a sealed chamber containing the material to be dehydrated and a flowable solid liquifiable hygroscopic agent for continuously extracting moisture from the drying medium, the moisture laden hygroscopic agent in liquified form being passed through a continuous closed circuit regenerating cycle for reuse in its solid form in the sealed chamber to minimize energy inputs for the drying and regenerating cycles.

Other objects, features and advantages of this invention will in part be obvious and in part hereinafter pointed out.

In the drawing, the sole figure is a diagrammatic representation of the process and apparatus embodying the invention.

In accordance with the instant invention, food products or other material may be dehydrated to preserve the same and left in a form which is readily rehydrated for use by passing over the material a gaseous drying medium inert to the material at substantially atmospheric pressure and at temperatures which prevent spoilage of the material being dried, as in the range of about −10° C. to about +20° C., to continuously extract the moisture. The moisture laden drying medium in turn is continuously passed through a liquifiable hygroscopic agent such as calcium chloride or lithium chloride to extract the moisture from said dehydrating medium and to thereby progressively convert the hygroscopic agent to liquid form which is readily passed to a regenerating zone and, after regeneration, returned for renewed contact with the moisture laden drying medium.

The gaseous drying medium is inert to the material being dried, and preferably is nitrogen or carbon dioxide, or a mixture thereof. Such inert drying medium is readily provided in the drying chamber by suitable combustion therein to convert the oxygen of the air to carbon dioxide in admixture with the normal nitrogen content of the air.

It has been found that products may be dehydrated to a desired degree within reasonable drying periods providing the drying medium is passed in paths substantially parallel to the surface of the material being dried and at a speed which is above the speed limit incident to ordinary laminar flow, thereby being of a turbulent nature so as to facilitate the contact of the material to be dried with the drying medium, through deliberate disturbance of the usual gas film at the surfaces of said material.

Furthermore, such operation may be conducted at atmospheric pressure or pressures slightly below atmospheric pressure incident to somewhat depressed temperature conditions within the drying chamber. It has been found that for most food products, the drying period is of the order of about 24 hours although such period may vary from about 16 to as much as 75 hours in some instances.

The process and apparatus of the instant invention is readily applicable to food products including fruit juices such as orange, lemon, grape, pineapple, apricot and passion fruit; whole or comminuted vegetables, in a raw, pre-cut or cooked state, including carrots, peas, cauliflower, onions, potatoes of the sweet and white variety, manioc and banana puree; and also fish, shrimp, lobster, poultry and meat. Also, the invention is applicable to various chemical manufacturing operations involving a drying step.

Referring to the sole figure, the dehydration process is carried out in the chamber B which is heat insulated and hermetically sealed by an insulated roof 1, insulated walls 2 and an insulated door 3 of the conventional type used to gain admittance to sealed refrigeration chambers.

Within the chamber B is disposed vertical frames 4 in side by side relation for carrying vertically spaced stacks of trays 5 (which are of the wire mesh type for solids or imperforate for liquids) to insure optimum circulation of the gaseous drying medium relative to the material which is to be dehydrated.

A manifold 6 extends from one side of frame 4 and is connected to a casing 7 with a fan 8 interposed in a portion of said manifold between frame 4 and casing 7. Within casing 7 are disposed inclined perforated trays 7A for holding a liquifiable solid hygroscopic agent such as calcium chloride or lithium chloride.

Means is provided within the chamber B for converting the air therein to inert form, as by an alcohol burner 9 which is effective to remove oxygen from the air, leaving the nitrogen content thereof in admixture with some carbon dioxide. The heat of combustion is absorbed by a heat exchanger 10. Of course, the other constituents of air such as argon will remain, together with small amounts of moisture incident to the combustion. When the product being dehydrated is not readily oxidized, air may be used as the dehydrating medium.

The resultant gaseous medium is circulated by means of the fan 8 in a closed circuit indicated by the arrows 12 to pass the gaseous medium successively through the frame 4 and over its trays 5, thence through the hygroscopic agent contained in casing 7 and again through frame 4. Thus, the gaseous medium through its continuous recirculation progressively extracts moisture from the material in trays 5, the moisture laden air passes into contact with the hygroscopic agent to extract its moisture content and is recirculated for renewed contact with the material in trays 5.

The interior of chamber B has its temperature stabilized at a predetermined temperature level which is determined by the nature of the product being dehydrated and more particularly, the maximum temperature beyond which deterioration or degradation of such material may take place. To obtain and maintain the predetermined temperature there is provided a heat exchange unit 13 within chamber B and an associated fan 11, together with a refrigerator unit 14 on the exterior of chamber B which is connected to heat exchange unit 13. Thus, by virtue of the insulation of chamber B and the operation of refrigerator unit 14, if necessary, a stabilized predetermined temperature level is maintained, taking into account the temperature of the material when placed in trays 5.

During the recirculation of the gaseous drying medium in a closed circuit without the admission to chamber B of additional gas, the hygroscopic agent in casing 7 increases its moisture content and passes downwardly between trays 7A in gradually liquifying form, to be collected in a receptacle 15 at the bottom of casing 7, and thence passes outwardly thereof by pipe 16 into a trough 17.

The inclined trays 7A within casing 7 may be arranged for slight agitation to facilitate the downward movement of the hygroscopic agent toward receptacle 15 in a manner known in the art.

A connector pipe 18 from trough 17 leads to a pump 19 driven by a motor 20 and contained within a closed chamber A, to pass the liquified hygroscopic agent by way of a line 21 and an interposed filter unit 21A to a preheater and evaporator 22 where moisture is driven off and exhausted through an outlet 22A extending from the roof of chamber A.

The resultant pasty mass of hygroscopic agent is then passed to concentrator 23, and thence to the periphery of a cooled crystallizer 24 which removes residual heat in the hygroscopic agent. The dried hygroscopic agent then passes to collecting trays 25 from which it flows by suitable mechanical transporting means (not shown) to a funnel 26 connected to a conduit 27 passing through the back wall 2 of chamber B which delivers the dried hygroscopic agent to the trays 7A in casing 7, where the cycle of moisture pick-up is repeated.

The fan 8 is operated to provide a movement of the gaseous drying medium at the rate of at least 3 feet per second and as much as 15 feet per second. Such speeds are above the value of that incident to the laminar flow of air, and are effective to lightly agitate liquids to be dried in trays 5 or to better penetrate solids in trays 5. With direct parallel flow of the gaseous drying medium, minimum resistance is encountered and fan 8 may be of a relatively low powered type.

With conduits 18 and 27 filled at all times with liquified and solid hygroscopic agent, respectively, the seal of chamber B is maintained. Thus, non-condensable volatiles evolved from materials being dried in trays 5 will remain within the chamber B and thus tend to maintain such materials at an equilibrium state in respect to such volatiles, thereby substantially maintaining the normal qualities of the volatiles in the dried end product. Thus the hygroscopic agent should be of a type which does not readily absorb the volatiles; for example, calcium chloride and lithium chloride. Any condensable vapors picked up by the hygroscopic agent, together with solid contaminants are removed therefrom by filter means 21A which is provided with suitable filter materials such as activated carbon and/or aluminum oxide.

It has been found that under the conditions indicated, most food products can be dehydrated to a desired moisture level within a period of about 15 to 30 hours, although in some instances such period may extend to about 70–75 hours.

By way of illustration, the process and apparatus of the instant invention has been applied as follows:

Precooked carrot slices 1/16″ thick were dehydrated for 48 hours at −3° C., with a gas speed of 5 to 6 feet per second, to a solid dry state (to about 4% residual moisture). Rehydration of the dried product took place in about 3 minutes. With an operating temperature of +3° C., in 24 hours the carrot slices were dehydrated to the same moisture content at the same gaseous medium speed, the dried product being in a soft, somewhat contracted state. Rehydration took place in about 10–12 minutes. Both products when rehydrated provided an excellent product.

Onion slices measuring 1/4″ x 1/4″ were dehydrated at about +15° C. for 18–22 hours at a gas speed of 10 feet per second. The dehydrated product showed very little loss of volatiles and flavor and was readily rehydrated in 3–4 minutes.

Manioc slices 1/4″ thick were dehydrated for 20 hours at +15° C. with a gas speed of 10 feet per second. Cooked whole shrimp measuring 3/4″ to 1″ in total length were dehydrated for 60 hours at −3° C. with a gas speed of 5 feet per second. The dehydrated shrimp were dehydrated in 2–4 minutes.

Passion fruit juice having an initial solids content of 10–12% was dehydrated to a 56% solids content after 24 hours at a temperature of +4° C. with a gas speed of 6 feet per second. The product had a viscosity like that of honey, and could be used directly as a syrup and with the addition of water as a beverage.

Pineapple juice having an initial solids content of 5% was dehydrated to a solids content of 35% in 24 hours at +4° C. with a gas speed of 6 feet per second.

With the process of the instant invention, no external heating or cooling is required for the actual extraction of moisture from the material in trays 5. The refrigerator unit 14 is only necessary to reach and maintain the predetermined temperature level dictated by the spoilage characteristics of the product or the desired final consistency of the dehydrated product. Thus carrot slices may be processed at +3° C. or −3° C., to produce products of different final consistency and corresponding rehydration periods.

The heat required to effect the regeneration of the liquified hygroscopic agent in evaporator 22 and concentrator 23 is minimized since such heat is directly applied to the liquified hygroscopic agent. As there is no heat applied or extracted in chamber B, other than that required to stabilize the predetermined temperature of the insulated chamber B, it will be apparent that the energy input of the process is at an absolute minimum and further may utilize the least expensive fuels and involve relatively simple and inexpensive apparatus.

As various changes might be made in the embodiments herein disclosed without departing from the spirit of the invention, it is understood that all matter herein shown or described shall be deemed illustrative and not by way of limitation, except as set forth in the appended claims.

What is claimed is:

1. The process for the dehydration of moisture containing material comprising passing a gaseous dehydrating medium in a path substantially parallel to the surface of said material at a rate of speed of from about 3 to about 15 feet per second, recirculating said dehydrating medium in a closed circuit past flowable solid liquifiable hygroscopic material for progessively removing moisture from said dehydrating medium and changing said hygroscopic material to liquified form, regenerating and forming said liquified hygroscopic material to solid flowable form for reuse in said closed circuit, and returning said hygroscopic material to said closed circuit after said hygroscopic material has been reformed to solid form.

2. The process of dehydrating moisture containing material comprising circulating gaseous dehydrating medium within a chamber containing said moisture containing material at a temperature which will prevent spoilage of said moisture containing material, contacting said moisture laden gaseous medium with flowable solid liquifiable hygroscopic material disposed within said chamber whereby to remove moisture from said gaseous medium and to convert said hygroscopic material to liquid form, passing said liquified hygroscopic material from said chamber to a regenerating zone, regenerating and forming said liquidfied hygroscopic material in said regenerating zone to flowable solid form and returning said regenerated hygroscopic material in flowable solid form back to said chamber.

3. The process of dehydrating moisture containing material comprising circulating gaseous dehydrating medium within an insulated sealed chamber containing said moisture containing material in a path parallel to the surface of said layers of moisture containing material and at a rate of speed above that producing a laminar flow of said gaseous medium to penetrate said layers of moisture containing material and at a temperature which will prevent spoilage of said moisture containing material, contacting said moisture laden gaseous medium with flowable solid liquifiable hygroscopic material disposed within said sealed chamber whereby to remove moisture from said gaseous medium and to convert said hygroscopic material to liquid form, passing said liquified hygroscopic material from said sealed chamber to a regenerating zone, converting said liquified hygroscopic material in said regenerating zone to flowable solid crystalline form and returning said regenerated hygroscopic material in flowable solid crystalline form back to said sealed chamber.

4. The process of dehydrating moisture containing material disposed within a hermetically sealed heat insulated chamber comprising recirculating a gaseous dehydrating medium within said chamber at a temperature not exceeding 20° C. for surface contact with the moisture containing material at a rate of speed of at least 3 feet per second to extract moisture from said material, passing the moisture containing gaseous medium through a zone of vertically spaced layers of flowable solid liquifiable hygroscopic agent for extracting moisture therefrom and thus gradually converting said agent to liquid form, passing the liquified hygroscopic agent to a regenerating zone, directly heating and reforming said liquified hygroscopic agent to flowable solid form and passing the flowable solid hygroscopic agent back to said zone of flowable solid liquifiable hygroscopic agent.

5. The process of dehydrating moisture containing material comprising disposing said material in layers within a hermetically sealed chamber, maintaining the interior of said chamber at a temperature of between −10° to +20° C., recirculating the gaseous atmosphere of said chamber in a path parallel to the surfaces of said material at a rate of speed of from 3 to 15 feet per second, removing moisture from said gaseous atmosphere by interposing a flowable solid liquifiable hygroscopic agent in said path which thus changes to liquid form, constantly passing hygroscopic agent in a closed circuit between said path and a regenerating zone, constantly regenerating and reforming said liquified hygroscopic agent in said regenerating zone to flowable solid form, and returning said flowable solid hygroscopic agent to said path.

6. The process of dehydrating moisture containing material disposed in a stack of trays located within a sealed chamber comprising circulating the atmosphere of said chamber at a temperature not exceeding 20° C. at substantially atmospheric pressure and a rate of speed of at least 3 feet per second directly over the surfaces of the material within said trays, and recirculating the moisture laden atmosphere through a zone of flowable solid liquifiable hygroscopic agent disposed on one side of said stack of trays to extract moisture from said atmosphere and to convert said agent to liquid form, passing said liquified agent out of said chamber, regenerating and reforming said liquified agent to convert the same to flowable solid form and passing said flowable solid agent back to said zone in said chamber.

7. The process of claim 5 and further including the step of converting said atmosphere to a mixture of nitrogen and carbon dioxide by combustion within said chamber.

8. Apparatus for dehydrating moisture containing material comprising a chamber, a stack of trays for holding said material disposed within said chamber, means for holding flowable solid crystallized liquifiable hygroscopic agent, means within said chamber for stabilizing the atmosphere thereof at a predetermined temperature, means for recirculating said atmosphere in a closed circuit between said trays and said hygroscopic agent holding means, a second chamber, evaporator, crystallizer and reforming means in said second chamber, means for passing hygroscopic agent in liquid form from said holding means to the evaporator in said second chamber and thence to said crystallizer and reforming means to solidify and crystallize said hygroscopic agent in flowable form, and means for passing the flowable crystallized hygroscopic agent back to said holding means.

9. A dryer comprising a first closed system including in combination a sealed drying chamber, means for holding material to be dried within said chamber, flowable solid crystalline hygroscopic means within said chamber for extracting moisture from a gaseous drying medium, means within said chamber for maintaining said drying medium at a predetermined temperature, means for circulating the drying medium in a closed path comprising in succession said moisture extracting means and said material holding means, and a second closed system including means for removing said hygroscopic means from said chamber, means for regenerating and reforming said hygroscopic means into flowable form including concentrator means and crystallizer means, and means for returning said flowable solid regenerated hygroscopic means to said chamber.

10. A dryer as in claim 9 wherein said means for circulating the gaseous drying medium includes duct means for directing said gaseous medium in paths directly over and parallel to the means for holding material to be dried.

11. A dryer as in claim 9 wherein said predetermined temperature does not exceed 0° C.

12. A dryer as in claim 9 wherein said predetermined temperature is in the range from about −10° C. to about +15° C.

13. A dryer comprising a chamber, means within said chamber for holding material to be dried, means within said chamber for circulating the atmosphere of said chamber for contact with said material to extract moisture therefrom, and tray means within said chamber for holding flowable solid liquifiable hygroscopic material in the path of circulation of said moisture containing atmosphere for extracting moisture therefrom, said tray means comprising a plurality of vertically spaced trays arranged in relatively tilted positions to allow passage of the hygroscopic material downwardly from one tray to another as the hygroscopic material acquires moisture and liquifies, and means for collecting and converting the liquified hygroscopic material to flowable solid form and returning the converted hygroscopic material to the top tray of said tray means.

14. A dryer as in claim 13 and further including means for agitating said trays.

15. The process for the dehydration of moisture containing material comprising passing a gaseous dehydrating medium past said material, recirculating said dehydrating medium in a closed circuit past flowable solid liquifiable hygroscopic material for progressively removing moisture from said dehydrating madium and changing said hygroscopic material to liquified form, regenerating and forming said liquified hygroscopic material to solid flowable form for reuse in said closed circuit, and returning said hygroscopic material to said closed circuit after said hygroscopic material has been reformed to solid form.

16. The process of claim 15 wherein said moisture containing material is maintained substantially at a temperature in the range of −10° C. to +20° C.

17. The process of claim 15 wherein the temperature of said moisture containing material does not exceed 0° C.

References Cited by the Examiner
UNITED STATES PATENTS

| | | | |
|---|---|---|---|
| 871,194 | 11/1907 | Thomas | 34—80 |
| 1,943,617 | 1/1934 | Miller | 34—36 |
| 2,249,624 | 7/1941 | Bichowsky | 34—27 |
| 2,422,536 | 6/1947 | Finnegan | 34—77 |
| 2,435,503 | 2/1948 | Levinson | 34—77 |
| 2,561,925 | 7/1951 | Jakubik | 34—164 |
| 2,913,832 | 11/1959 | Kaufman | 34—80 |

WILLIAM F. O'DEA, *Primary Examiner.*

NORMAN YUDKOFF, *Examiner.*

W. C. EVERETT, A. D. HERRMANN,
*Assistant Examiners.*